US012403694B2

(12) United States Patent
Hasegawa et al.

(10) Patent No.: US 12,403,694 B2
(45) Date of Patent: Sep. 2, 2025

(54) LIQUID DISCHARGE CARTRIDGE

(71) Applicant: CANON KABUSHIKI KAISHA, Tokyo (JP)

(72) Inventors: Shuichi Hasegawa, Kanagawa (JP); Yukuo Yamaguchi, Tokyo (JP); Keisuke Iinuma, Kanagawa (JP); Junichiro Iri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/494,467

(22) Filed: Oct. 25, 2023

(65) Prior Publication Data

US 2024/0051299 A1 Feb. 15, 2024

Related U.S. Application Data

(62) Division of application No. 17/337,643, filed on Jun. 3, 2021, now Pat. No. 11,833,822.

(30) Foreign Application Priority Data

Jun. 10, 2020 (JP) ................................ 2020-101220

(51) Int. Cl.
*B41J 2/16* (2006.01)
*B41J 2/175* (2006.01)

(52) U.S. Cl.
CPC ......... *B41J 2/1637* (2013.01); *B41J 2/17513* (2013.01); *B41J 2/17553* (2013.01);
(Continued)

(58) Field of Classification Search
CPC ...... B41J 2/17513; B41J 2/01; B41J 2/17559; B41J 2/1753; B41J 2/175; B41J 2/17533;
(Continued)

(56) References Cited

U.S. PATENT DOCUMENTS 6,180,018 B1 1/2001 Miyagawa et al.
6,745,467 B1 * 6/2004 Terai ..................... B41J 2/1623 347/56
(Continued)

FOREIGN PATENT DOCUMENTS

CN 107244145 A 10/2017
JP 10-6511 A 1/1998
(Continued)

*Primary Examiner* — Thiem D Phan
(74) *Attorney, Agent, or Firm* — Venable LLP

(57) ABSTRACT

A liquid discharge cartridge manufacturing method includes a first step of individually shaping a first shaped member and a second shaped member that form a housing of a liquid discharge cartridge, and a second step of joining the first shaped member and the second shaped member to be bonded to each other with molten resin. The first step includes shaping a wall section in the first shaped member, the wall section forming a recess for accommodating the molten resin, and shaping a projection in the second shaped member, the projection extending such that the projection is located at the outer side of the wall section and adjacent to the wall section, with a predetermined gap being formed between the projection and the wall section, when the first and second shaped members are joined.

16 Claims, 7 Drawing Sheets

(52) U.S. Cl.
CPC ..... *B41J 2/17559* (2013.01); *Y10T 29/49346* (2015.01); *Y10T 29/49401* (2015.01); *Y10T 29/49417* (2015.01); *Y10T 29/5313* (2015.01)

(58) Field of Classification Search
CPC ................. B41J 2/14024; B41J 2/1637; Y10T 29/49401; Y10T 29/5313
USPC .......... 29/729, 700, 428, 801, 890.09, 890.1
See application file for complete search history.

(56) References Cited

U.S. PATENT DOCUMENTS

| | | | |
|---|---|---|---|
| 10,071,512 | B2 | 9/2018 | Kimura et al. |
| 10,081,185 | B2 * | 9/2018 | Kimura .................. B41J 2/1433 |
| 10,471,719 | B2 | 11/2019 | Toda et al. |
| 10,870,279 | B2 | 12/2020 | Kondo et al. |
| 11,065,874 | B2 | 7/2021 | Shimizu et al. |
| 2018/0361745 | A1 | 12/2018 | Petersen et al. |

FOREIGN PATENT DOCUMENTS

| | | | |
|---|---|---|---|
| JP | 2010-201870 | A | 9/2010 |
| JP | 2014-172352 | A | 9/2014 |
| JP | 2016-215558 | A | 12/2016 |
| JP | 2018-001453 | A | 1/2018 |
| JP | 2019-206123 | A | 12/2019 |

* cited by examiner

LIQUID DISCHARGE CARTRIDGE

CROSS-REFERENCE TO RELATED APPLICATIONS

This application is a divisional application of U.S. patent application Ser. No. 17/337,643, filed Jun. 3, 2021, which claims the benefit of Japanese Patent Application No. 2020-101220, filed Jun. 10, 2020. Both prior applications are hereby incorporated by reference herein in their entirety.

BACKGROUND OF THE INVENTION

Field of the Invention

The present invention relates to a liquid discharge cartridge for discharging liquid onto a recording material and a manufacturing method for the same.

Description of the Related Art

An image recording device that discharges liquid such as ink onto recording materials to record images includes an inkjet recording cartridge (liquid discharge cartridge). Conventionally, the inkjet recording cartridge is formed by bonding a tank case and a lid, which are shaped members, by ultrasonic welding. A multicolor inkjet recording head (liquid discharge head) and an inkjet recording cartridge include flow passage plates also bonded by ultrasonic welding. In recent years, a technique has been proposed that forms an inkjet recording head and an inkjet recording cartridge by joining shaped members to be bonded to each other with molten resin by using an in-mold assembly molding technique.

However, in the conventional technique, resin leakage may occur when the members are bonded with molten resin. For example, Japanese Patent Application Publication No. 2018-001453 describes a method that improves efficiency of manufacturing liquid supply components while stably securing the effective area of a filter. In the method, a filter in a compressed state is sandwiched between the facing surfaces of shaped members and molten resin is injected, whereby two shaped members are bonded and the periphery of the filter is sealed. This achieves the efficient manufacturing of liquid supply components with high dimensional accuracy.

SUMMARY OF THE INVENTION

When a first shaped member is joined to a second shaped member and molten resin is injected to bond the shaped members to each other, the molten resin may leak. In particular, the technique described in the Japanese Patent Application Publication No. 2018-001453 has the following issues.

Issue 1: Prevention of Resin Leakage in Bonding of Shaped Members

When the filter in a compressed state is sandwiched between the facing surfaces of the first and second shaped members and molten resin is injected to achieve the bonding of the shaped members and the sealing of the periphery of the filter, the wall sections defining the bonding groove, into which the molten resin is injected, of the second shaped member may collapse, whereby resin leakage may be caused. The technique of the Japanese Patent Application Publication No. 2018-001453 bonds the shaped members by sandwiching the filter in a compressed state with molten resin, but the collapsing of the walls defining the bonding groove and resin leakage may occur when first and second shaped members are joined and then bonded with molten resin even in a configuration that does not include a filter.

Issue 2: Weak Joining Between Shaped Members

The shaped members are bonded to each other, with the filter being compressed therebetween. Depending on the compression state of the filter, resin leakage may occur. The technique of the Japanese Patent Application Publication No. 2018-001453 bonds the shaped members by sandwiching the filter in a compressed state with molten resin, but the collapsing of the walls defining the bonding groove and resin leakage may occur depending on the joining state when first and second shaped members are joined even in a configuration that does not include a filter.

It is an objective of the present invention to provide a technique that suppresses a shaping defect of a joint section between two shaped members occurring in the manufacturing of liquid discharge heads.

To achieve the above object, a method for manufacturing a liquid discharge head of the present invention includes the following:

- a first step of individually shaping a first shaped member and a second shaped member that form a housing of a liquid discharge cartridge; and
- a second step of joining the first shaped member and the second shaped member to be bonded to each other with molten resin, wherein the first step includes:

- shaping a wall section in the first shaped member, the wall section forming a recess for accommodating the molten resin; and
- shaping a projection in the second shaped member, the projection extending such that the projection is located at an outer side of the wall section and adjacent to the wall section, with a predetermined gap being formed between the projection and the wall section when the first and second shaped members are joined.

To achieve the above object, a liquid discharge head of the present invention includes the following:

The present invention suppresses a shaping defect of a joint section between two shaped members occurring in the manufacturing of liquid discharge heads.

Further features of the present invention will become apparent from the following description of exemplary embodiments with reference to the attached drawings.

BRIEF DESCRIPTION OF THE DRAWINGS

FIGS. 4A and 4B are cross-sectional perspective views taken along line V-V in

FIG. 1;

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Figure 1:
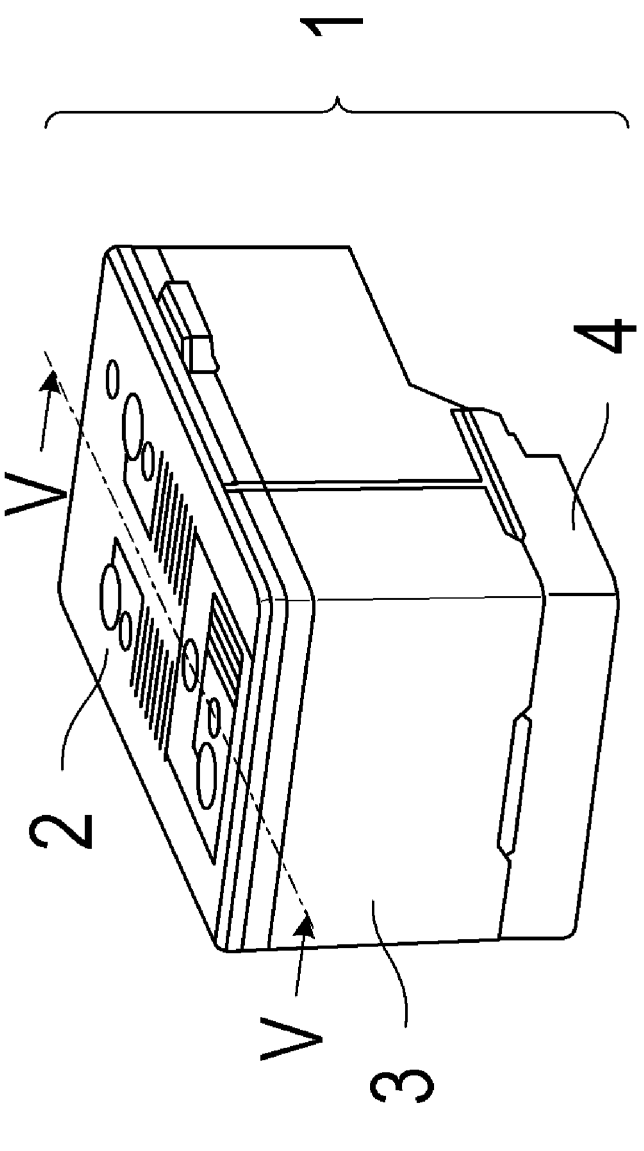
FIG. 1 is a schematic perspective view of an inkjet recording cartridge according to the present invention.
Figure 2:
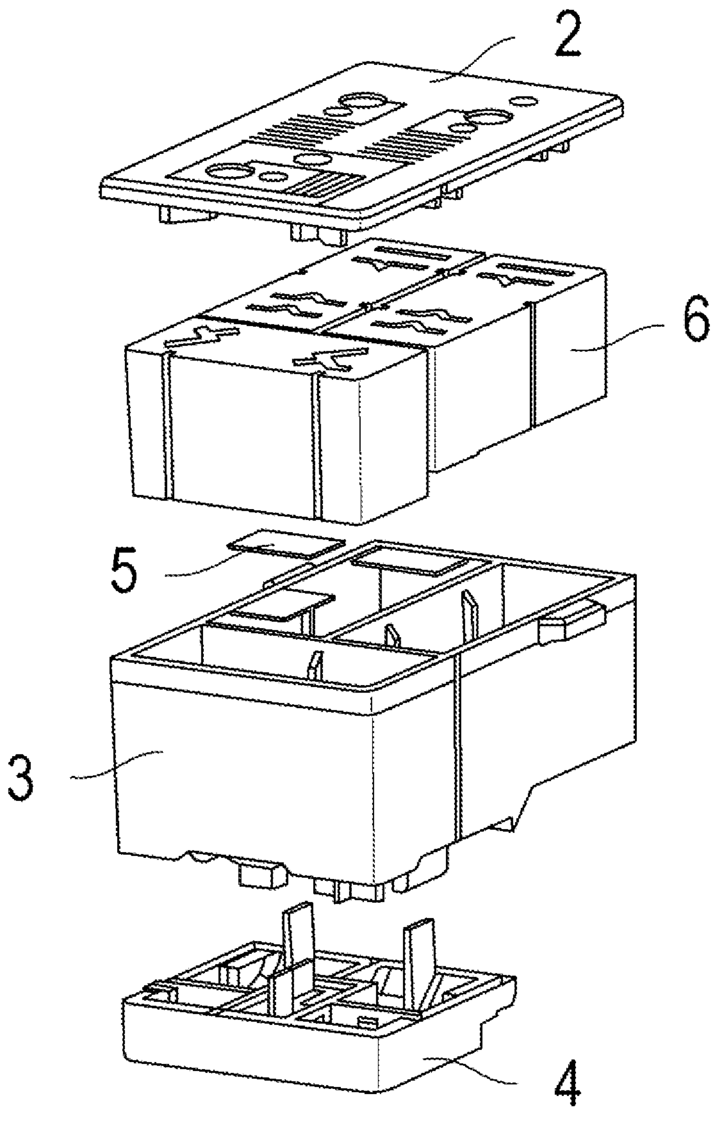
FIG. 2 is an exploded perspective view of the inkjet recording cartridge according to the present invention.

FIG. 1 is a perspective view of an example of an inkjet recording cartridge 1 (liquid discharge cartridge) of an embodiment of the present invention. The inkjet recording cartridge 1 includes a first shaped member 2, a second shaped member 3, and a third shaped member 4. FIG. 2 is an exploded perspective view of the inkjet recording cartridge 1 according to the present invention. A filter 5 and an absorber 6 are incorporated in the first shaped member 2, the second shaped member 3, and the third shaped member 4.

Figure 3A:
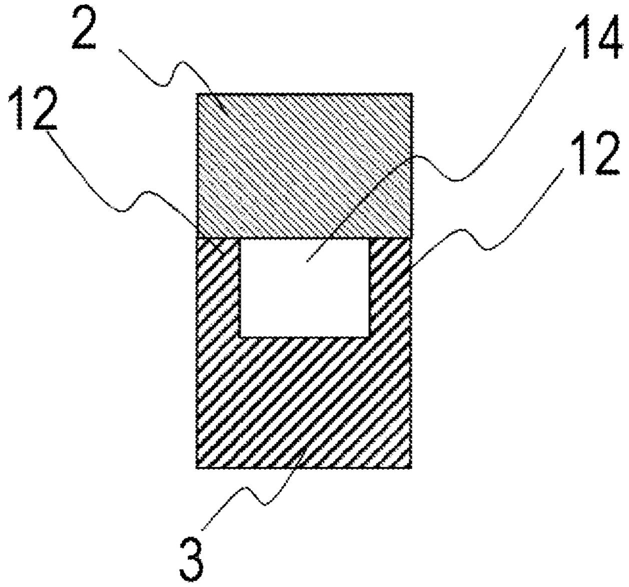
FIGS. 3A and 3B are enlarged views of a bonding section, illustrating a conventional joining method for shaping.
Figure 3B:
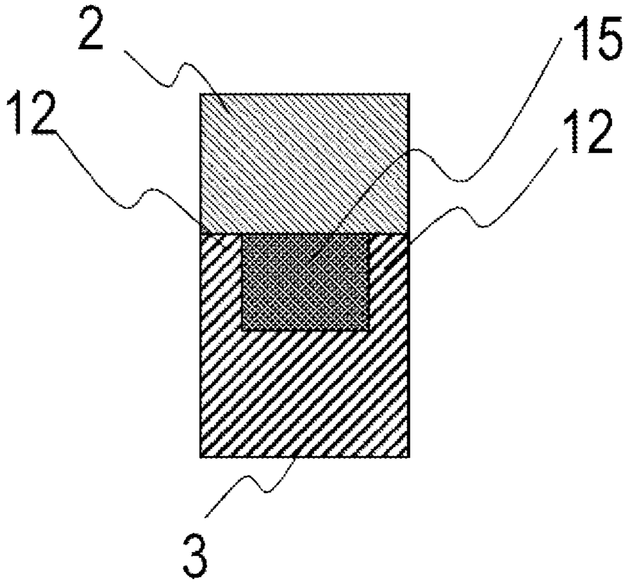

FIGS. 3A and 3B are enlarged views of a bonding section, illustrating a conventional joining method for shaping. FIG. 3A is an enlarged view of a cross-section in a state in which the first and second shaped members 2 and 3 are joined. FIG. 3B is an enlarged view of a cross-section in a state in which the first and second shaped members 2 and 3 are bonded with molten resin 15.

Figure 4A:
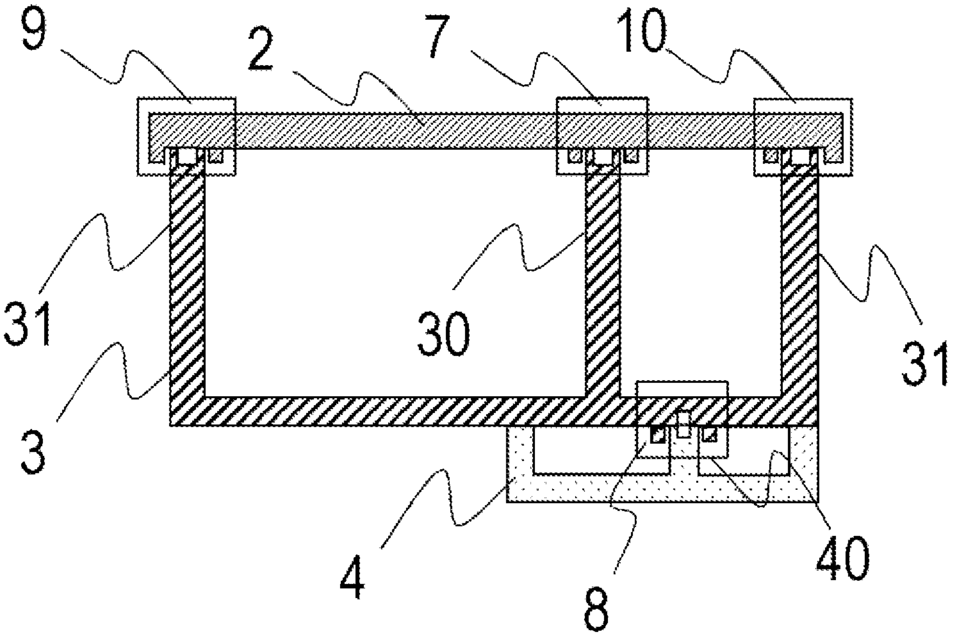

FIG. 4A is a schematic cross-sectional view taken along line V-V in FIG. 1 of the liquid discharge head of the present embodiment. FIG. 4A shows bonding states in bonding sections 7, 9, and 10 between the first shaped member 2, which serves as the other member, and the second shaped member 3, which serves as one of the members, and a bonding section 8 between the second shaped member 3, which serves as the other member, and the third shaped member 4, which serves as one of the members. The second shaped member 3 has a partition wall 30, which partitions off an accommodation space for accommodating the absorber 6 in the internal space of the housing of the liquid discharge cartridge 1, and a side wall 31 forming the side wall of the housing. The distal end surfaces of the walls serve as joint surfaces to the first shaped member 2. The distal end surface of each wall includes a groove-shaped recess extending in the direction in which the distal end surface extends. Each recess is defined by a pair of wall sections. A pair of projections extending from the joint surface of the second shaped member 3 toward the first shaped member 2 is located adjacent to the wall sections. The projections are located at the outer sides of the wall sections to sandwich the wall sections. Each bonding section is thus formed.

The projections may have the shape of a wall corresponding to the pair of wall sections and be continuous in the direction in which the wall sections extend. Alternatively, the projections may be provided sporadically only at necessary spots, provided that the projections can limit the collapsing of the wall sections, which will be described below.

The bonding section 7 is a bonding section between the partition wall 30 of the second shaped member 3 and the first shaped member 2, while the bonding sections 9 and 10 are bonding sections between the side wall 31 of the second shaped member 3 and the first shaped member 2. The third shaped member 4 is a shaped member that forms a liquid discharge head portion having a discharge port for recording materials. A bonding section 8, which is similar to the bonding section 7, is provided between the second and third shaped members 3 and 4. The bonding section 8 is located between a partition wall 40, which is one of the walls defining a liquid flow passage, and the second shaped member 3.

As used in the present embodiments and the descriptions of embodiments, the names such as the "first shaped member" and the "second shaped member" do not necessarily correspond to the "first shaped member" and "second shaped member" in the present invention. For example, in the bonding between the first shaped member 2 and the second shaped member 3 of the above embodiment, the first shaped member 2 corresponds to the second shaped member in the present invention, and the second shaped member 3 corresponds to the first shaped member in the present invention. However, in the bonding between the second shaped member 3 and the third shaped member 4, the third shaped member 4 corresponds to the first shaped member in the present invention, and the second shaped member 3 corresponds to the second shaped member in the present invention.

Figure 4B:
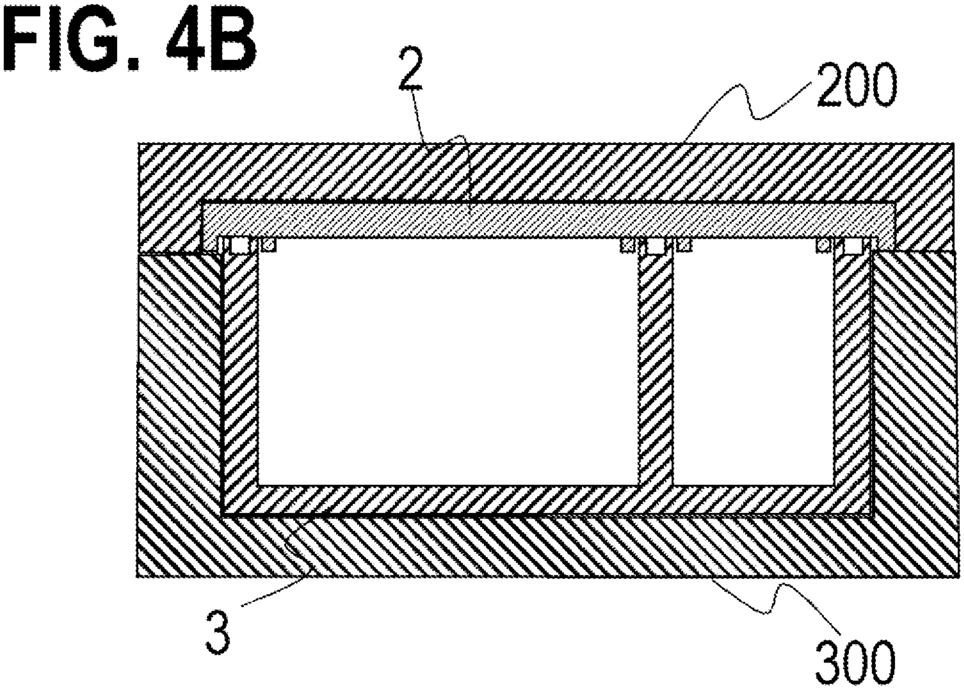

FIG. 4B is a schematic cross-sectional view of a cross-section taken along line V-V in FIG. 1, illustrating a method for manufacturing a liquid discharge head of the present embodiment. In the first step of this manufacturing method, the first shaped member 2, the second shaped member 3, and the third shaped member 4 are individually shaped and manufactured by injection molding or the like. In the second step, these shaped members are bonded and integrated to form the housing of the liquid discharge cartridge 1.

In the second step, the molds to which the shaped members are fixed are bonded to each other so that the shaped members are joined, and molten resin is injected into the joint section. The resin is then cured to bond and integrate the shaped members together. FIG. 4B schematically shows a state in which the molds are clamped to integrate the first and second shaped members 2 and 3 together. In this state, the first shaped member 2 is fixed to a first mold 200, while the second shaped member 3 is fixed to a second mold 300. The first and second molds 200 and 300 are clamped together. Although not shown in FIG. 4B, the integration between the second and third shaped members 3 and 4 may be performed simultaneously when the first and second shaped members 2 and 3 are integrated. Alternatively, the second and third shaped members 3 and 4 may be integrated in another step in a step-by-step manner. Molten resin is injected into the cavity defined by the first shaped member 2, the first mold 200, the second shaped member 3, and the second mold 300 through an injection port (not shown), and a resin bonding portion is formed in each bonding section.

The first and second molds 200 and 300 may be the molds used to injection-mold the first and second shaped members 2 and 3, respectively, or may be different molds that are set after the shaped members are shaped.

Figure 5A:
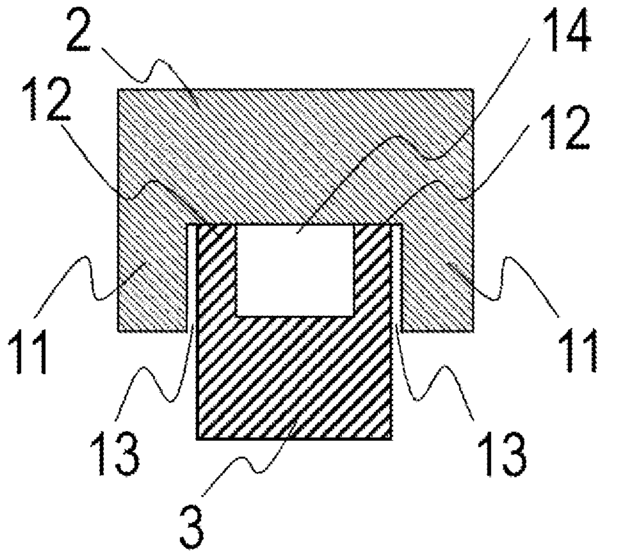
FIGS. 5A and 5B are diagrams illustrating a shaping manufacturing method according to a first embodiment of the present invention.
Figure 5B:
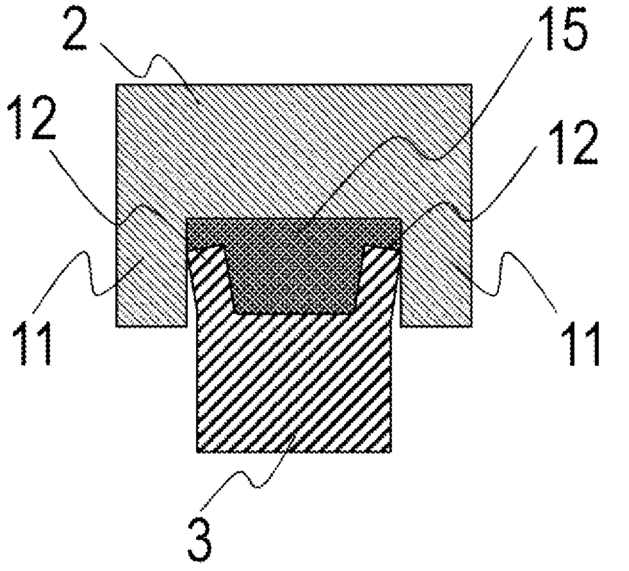

FIGS. 5A and 5B are enlarged views of a cross-section of the bonding section 7 of FIG. 4A, illustrating the shaping manufacturing method in the present embodiment. FIG. 5A is an enlarged view of a cross-section in a state in which the first and second shaped members 2 and 3 are joined. FIG. 5B is an enlarged view of a cross-section in a state in which the first and second shaped members 2 and 3 are bonded with molten resin 15. The first shaped member 2 includes the projections 11, which support the wall sections 12 of the second shaped member 3 if the wall sections 12 collapse when the molten resin 15 is injected into the bonding groove 14 to bond the members. As shown in the figure, after the integral molding is performed by injecting molten resin, the distance between the two wall sections 12 extending toward the first shaped member 2 increase toward the distal end sections, and the wall sections 12 are in contact with the projections 11 at least in the distal end sections. This state is illustrated as a typical example, and the wall sections 12 are not necessarily shaped into this state. It will be apparent to those skilled in the art that a resin bonding portion can be formed when the resin in the recess cures with the predetermined gaps between the wall sections 12 and the projections 11 being maintained as before the molten resin injection.

Figure 6A:
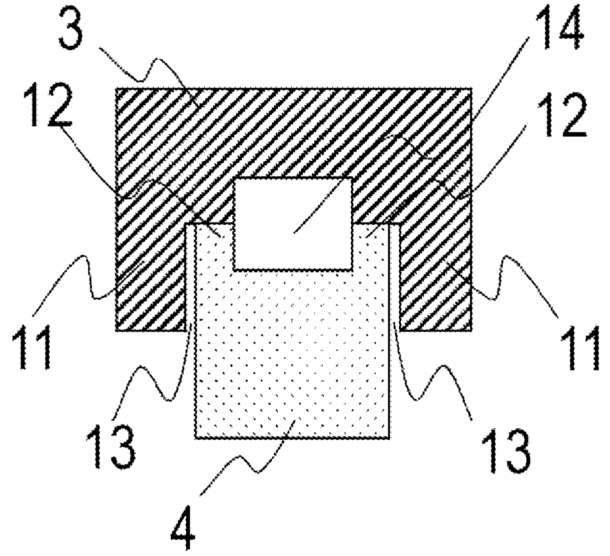
FIGS. 6A and 6B are diagrams illustrating a shaping manufacturing method according to a second embodiment of the present invention.
Figure 6B:
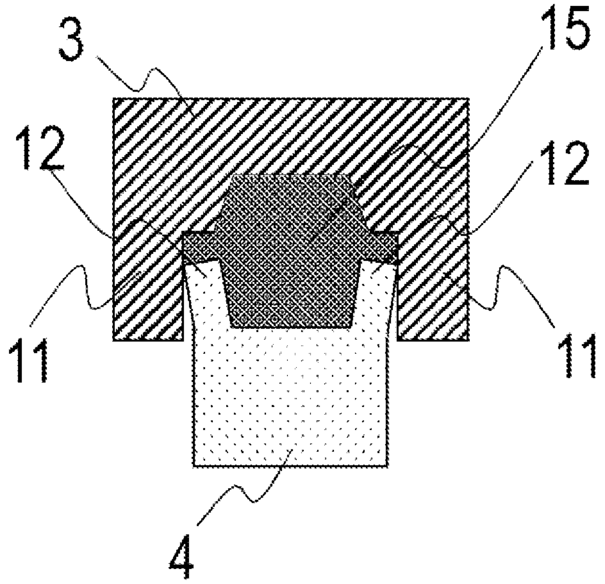

FIGS. 6A and 6B are enlarged views of a cross-section of the bonding section 8 of FIG. 4A, illustrating a shaping manufacturing method in a second embodiment of the present embodiment. FIG. 6A is an enlarged view of a cross-section in a state in which the second and third shaped members 3 and 4 are joined. FIG. 6B is an enlarged view of a cross-section in a state in which the second and third shaped members 3 and 4 are bonded with molten resin 15. The second shaped member 3 includes the projections 11, which support the wall sections 12 of the third shaped member 4 if the wall sections 12 collapse when the molten resin 15 is injected into the bonding groove 14 to bond the members. In this embodiment, the second and third shaped members 3 and 4 each have a bonding groove 14.

Figure 7A:
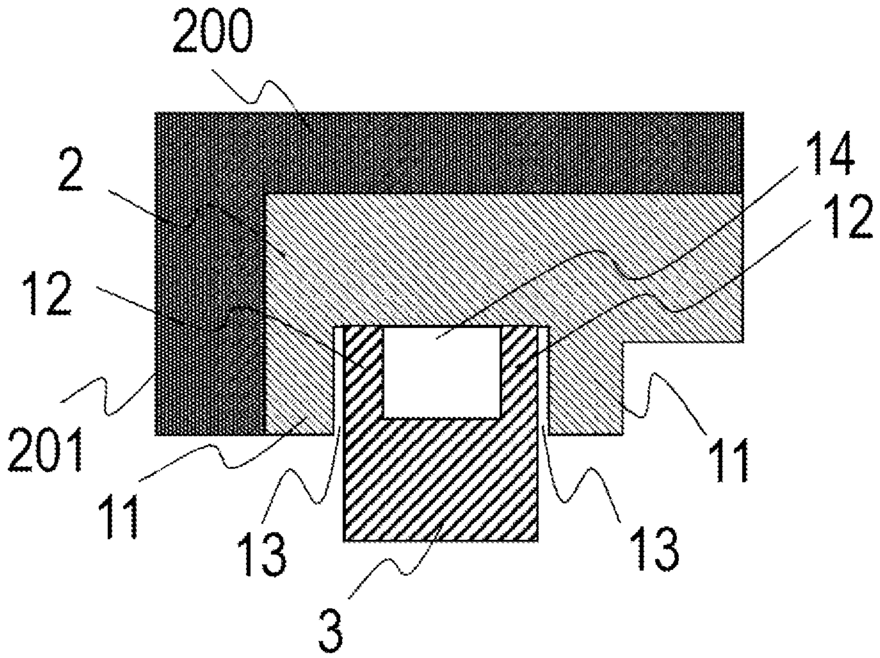
FIGS. 7A and 7B are diagrams illustrating a shaping manufacturing method according to a third embodiment of the present invention.
Figure 7B:
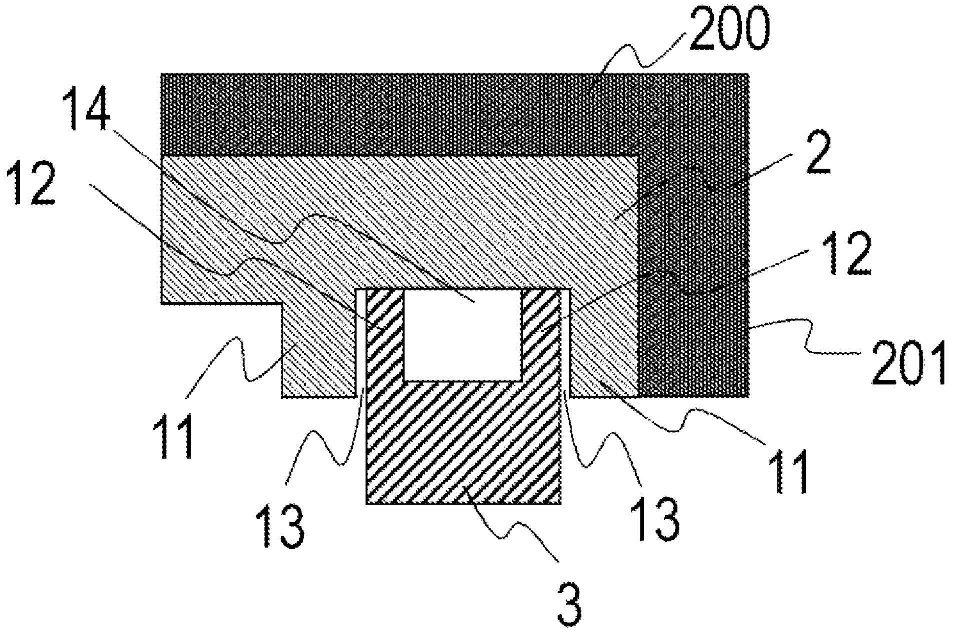

FIGS. 7A and 7B are enlarged views illustrating a shaping manufacturing method of a third embodiment of the present invention. In each of the bonding sections 9 and 10 of FIG. 4A, a projection 11 of the first shaped member 2 serves as the outer surface of the first shaped member 2 and thus can be less rigid. For this reason, in this configuration, the mold 200 supports projections 11 of the first shaped member 2. FIG. 7A is an enlarged view of a cross-section of the bonding section 9 having the shape shown in FIG. 4A in a configuration in which the mold 200 has a support section 201 for supporting. FIG. 7B is an enlarged view of a cross-section of the bonding section 10 having the shape shown in FIG. 4A in a configuration in which the mold 200 has a support section 201 for supporting. As described above, the present invention provides the projections 11, which support the wall sections 12 if the wall sections 12 collapse when the shaped members are bonded with molten resin 15, thereby preventing resin leakage.

The present invention is described in detail below with reference to examples, but the present invention is not limited to these examples.

Example 1

FIGS. 5A and 5B are enlarged views of a cross-section of the bonding section 7 of FIG. 4A, illustrating a shaping manufacturing method according to Example 1 of the present invention. The inkjet recording cartridge 1 of the present invention may be divided into a plurality of liquid storage tanks or may include a liquid storage tank of one color. For example, the first shaped member 2 is bonded to the second shaped member 3 with molten resin 15 so that different liquids such as cyan (C), magenta (M), and yellow (Y) are stored separately in the respective storage tanks. Alternatively, when a liquid storage tank for one color, for example black (BK), is provided, it is not necessary to separate different liquids. The shaping manufacturing method prevents the leakage of liquid to the outside by bonding the first and second shaped members 2 and 3 with the molten resin 15.

FIG. 5A shows a state in which the first and second shaped members 2 and 3 are joined in a configuration in which the first shaped member 2 has projections 11. To join the members as shown in FIG. 5A, the second shaped member 3 needs to be fitted into the first shaped member 2. To this end, gaps 13 are provided to avoid interference between the first and second shaped members 2 and 3. For example, each gap 13 is preferably about from 50 to 100 If the gaps are too narrow, the shaped members may interfere when fitted to each other. If the gaps are too wide, the molten resin 15 may leak when bonding the members.

FIG. 5B shows a state in which the first and second shaped members 2 and 3 are bonded with the molten resin 15. The projections 11 are provided in the first shaped member 2 to prevent resin leakage when the molten resin 15 is injected into the bonding groove 14 to bond the members. The projections 11 can support the wall sections 12 of the second shaped member 3 if the wall sections 12 collapse when the molten resin 15 is injected, preventing the leakage of the molten resin 15. The gaps 13 are provided between the projections 11 of the first shaped member 2 and the wall sections 12 of the second shaped member 3 to avoid interference when the members are fitted. Additionally, the gaps 13 are also formed taking into account the projections 11, which support the wall sections 12 when the wall sections 12 collapse. If the gaps are too narrow, the shaped member may interfere with each other when fitted, even though narrow gaps are advantageous in preventing leakage of the molten resin 15 in resin bonding and allow the projections 11 to support the wall sections 12. If the gaps are too wide, the projections 11 may fail to support the wall sections when the wall sections collapse in resin bonding, causing the leakage of the molten resin 15. As such, the gaps are provided taking into consideration both the fitting surfaces and the joint surfaces. Furthermore, the molten resin 15 is preferably a thermoplastic resin that has higher fluidity than the resin of the first and second shaped members 2 and 3.

As for issue 1 described above, the projections of the first shaped member support the wall sections defining the bonding groove, into which the molten resin is injected, of the second shaped member when the wall sections collapse, preventing resin leakage. This advantageously bonds the shaped members and seals the periphery of the filter. Even in a configuration that does not include a filter, the projections of the first shaped member still have an advantageous effect of supporting the wall sections defining the bonding groove of the second shaped member when the wall sections collapse, preventing resin leakage.

As for issue 2 described above, when the shaped members are bonded while compressing a filter, the projections of the first shaped member support the walls defining the bonding groove, into which molten resin is injected, of the second shaped member when the filter compression state changes and the walls collapse, preventing resin leakage. Even in a configuration that does not include a filter, the projections of the first shaped member support the wall sections defining the bonding groove, into which the molten resin is introduced, of the second shaped member when the state of bonding surfaces of the first and second shaped members changes and the wall sections collapse, thereby preventing resin leakage.

Example 2

FIGS. 6A and 6B are enlarged views of a cross-section of the bonding section 8 of FIG. 4A, illustrating a shaping manufacturing method according to Example 2 of the present invention. FIG. 6A shows a state in which the second shaped member 3 is joined to the third shaped member 4 in a configuration in which the second shaped member 3 has projections 11 and a bonding groove 14 is formed in each of the second and third shaped members 3 and 4. To join the second and third shaped members 3 and 4 as shown in FIG. 6A, the members need to be fitted in the same manner as Example 1, and a gap 13 of about from 50 to 100 μm is preferably provided on each side in the same manner. If the gaps are too narrow, the shaped members may interfere when fitted to each other. If the gaps are too wide, the molten resin 15 may leak when bonding the members. FIG. 6B shows a state in which the second and third shaped members 3 and 4 are bonded with molten resin 15. To prevent resin leakage when the molten resin 15 is injected into the bonding grooves 14 to bond the members, the second and third shaped members 3 and 4 of Example 2 each include a bonding groove 14 (facing recess). That is, the second shaped member 3 has a bonding groove 14, which is formed in the position facing the bonding groove 14 formed in the third shaped member 4. By separately providing the bonding grooves 14 in the shaped members to be bonded, the pressure applied when the members are bonded with molten resin 15 is dispersed. This configuration provides a fundamental solution to limit the collapsing of the wall sections 12. Additionally, the projections 11 can support the wall sections 12 if the wall sections 12 collapse, thereby preventing the leakage of the molten resin 15.

Example 3

FIGS. 7A and 7B are enlarged views illustrating a shaping manufacturing method of Example 3 of the present invention and include parts (support sections 201) of the mold 200 for preventing the leakage of the molten resin 15 from the bonding sections 9 and 10 of FIG. 4A. FIGS. 7A and 7B each show a state in which the first and second shaped members 2 and 3 are joined in a configuration in which the first shaped member 2 includes projections 11 and its outer surface is supported by the support section 201 of the mold 200. To further prevent the leakage of the molten resin 15 in Example 1 in which the first shaped member 2 has the projections 11, at a time of bonding with the molten resin 15, the mold 200 has the support section 201, which supports the side of the projection 11 serving as the outer surface that is opposite to the side that faces the wall section 12 of the projection 11. Consequently, the projections 11 are less likely to be deformed by the molten resin 15, thereby preventing resin leakage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid discharge cartridge for discharging liquid comprising:

a first shaped member; and a second shaped member, wherein the first shaped member and the second shaped member come into contact with each other at contact surfaces thereof, wherein the first shaped member includes a first recessed portion and a pair of wall sections, the first recessed portion being recessed with respect to the contact surfaces, and the pair of wall sections extending from the contact surfaces so as to face each other and sandwiching the first recessed portion, wherein the second shaped member includes a second recessed portion and a pair of projections, the second recessed portion being recessed with respect to the contact surfaces, and the pair of projections extending from the contact surfaces so as to face each other and sandwiching the second recessed portion, wherein each tip surface of the pair of wall sections and the second shaped member come into contact with each other at the contact surfaces, and wherein, in a state where the pair of projections sandwiches the pair of wall sections, the first shaped member and the second shaped member are joined by resin accommodated in the first recessed portion and the second recessed portion.

2. The liquid discharge cartridge according to claim 1, wherein the pair of second projections project toward the first shaped member, and wherein at least distal end sections of the pair of second projections are in contact with the pair of first projections.

3. The liquid discharge cartridge according to claim 2, wherein a distance between the pair of second projections increases gradually toward the distal end sections.

4. The liquid discharge cartridge according to claim 1, wherein gaps are formed between base sections of the pair of second projections and the pair of first projections.

5. The liquid discharge cartridge according to claim 1, wherein an angle between each of the contact surfaces and one of the pair of wall sections is more than 90°.

6. The liquid discharge cartridge according to claim 1, wherein the second shaped member is a housing that accommodates liquid inside of the housing, wherein the housing includes a plurality of side walls, and wherein the pair of projections are formed on an end surface of a side wall of the plurality of side walls that face the first shaped member.

7. The liquid discharge cartridge according to claim 6, wherein the first shaped member is a lid section of the housing, and wherein the pair of wall sections are formed on a surface of the lid section that faces the housing.

8. The liquid discharge cartridge according to claim 6, wherein the housing includes a partition wall that partitions off an internal space of the housing, and wherein the pair of projections are formed on an end surface of the partition wall that faces the first shaped member.

9. The liquid discharge cartridge according to claim 8, wherein the internal space is partitioned into three spaces by the partition wall.

10. The liquid discharge cartridge according to claim 1, wherein the first shaped member is a housing that accommodates liquid inside of the housing, and wherein the pair of wall sections are formed on a bottom surface of the housing.

11. The liquid discharge cartridge according to claim 10, wherein the second shaped member is a liquid discharge head section that includes a discharge port for discharging the liquid, and wherein the pair of projections are formed on an end surface of the liquid discharge head section that faces the housing.

12. The liquid discharge cartridge according to claim 10, wherein the second shaped member is a liquid discharge head section that includes a discharge port for discharging the liquid, wherein the liquid discharge head section includes a partition wall that partitions off an internal space of the liquid discharge head section, and wherein the pair of projections are formed on an end surface of the partition wall that faces the housing.

13. The liquid discharge cartridge according to claim 1, wherein the each tip surface of the pair of wall sections and the second shaped member come into contact with each other via the resin.

14. The liquid discharge cartridge according to claim 1, wherein the pair of wall sections project toward the second shaped member, and wherein at least tip portions of the pair of wall sections come into contact with the pair of projections.

15. The liquid discharge cartridge according to claim 14, wherein a distance between the pair of wall second increases gradually toward the tip portions.

16. The liquid discharge cartridge according to claim 1, wherein a gap is formed between at least a part of the pair of wall sections and at least a part of the pair of projections.

* * * * *